F. BRAUNE.
NUT LOCK.
APPLICATION FILED AUG. 27, 1908.

936,299.

Patented Oct. 12, 1909.

Witnesses
B. M. Offutt
G. H. Ayres

Inventor
Fritz Braune

By
G. Ayres
Attorney

UNITED STATES PATENT OFFICE.

FRITZ BRAUNE, OF NEW BRAUNFELS, TEXAS.

NUT-LOCK.

936,299.  Specification of Letters Patent.  Patented Oct. 12, 1909.

Application filed August 27, 1908. Serial No. 450,532.

*To all whom it may concern:*

Be it known that I, FRITZ BRAUNE, a citizen of the United States, residing at New Braunfels, in the county of Comal and State of Texas, have invented certain new and useful Improvements in Nut-Locks, of which the following is a specification.

My invention relates to improvements in nut-locks, and it consists in the constructions, combinations and arrangements herein described and claimed.

An object of my invention is to provide a strong and secure nut lock which can be conveniently applied after the nut has been screwed nearly home; thereby avoiding danger of injury or distortion of the lock while positioning the nut.

A further object of my invention is to provide an improved nut-lock formed with legs for receiving a bolt therebetween, and provided with anchoring lugs for preventing rotation of the lock and strongly bracing said legs.

Figure 1:
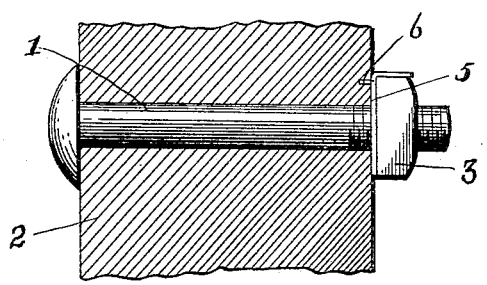
Figure 2:
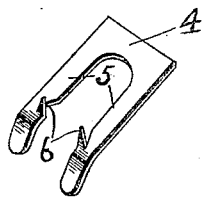

In the accompanying drawings, forming a part of this application and in which similar reference numerals indicate corresponding parts in the several views: Figure 1 is a section of a support showing my invention applied thereto, and Fig. 2 is a perspective view, showing the bottom, or inner, face of my nut-lock.

Referring to the drawings, 1 indicates any usual form of bolt employed with a support 2 and provided with a nut 3.

My improved nut-lock is shown comprising a base plate 4, formed with parallel legs 5 for receiving a bolt therebetween; the free ends of said legs being inclined to permit ready bending thereof into locking engagement with the side of a nut. The legs 5 are provided at their bent portions with downwardly turned pointed lugs 6, for anchoring the lock against rotation and strongly bracing said legs at their free ends. This provides a construction in which the relatively weak and thin legs are braced on one side of the bolt by their connecting base plate 4 and at the opposite side of the bolt by the rigid anchoring lugs 6 projecting from their bent portions.

From the above description, it will be understood that my invention provides an improved nut-lock adapted to be positioned about a bolt without removal of the nut, and in which the lockingly engaging legs are strongly braced at their free ends.

Having thus described my invention, what I claim as new and desire to secure by Letters-Patent is:

A nut lock comprising a base plate, parallel legs extending from said plate for receiving a bolt therebetween, said legs being bent at their free ends for lockingly engaging the side of a nut, and pointed anchoring lugs projecting from said legs at their bent portions, substantially as described.

In testimony whereof I affix my signature in presence of two witnesses.

FRITZ BRAUNE.

Witnesses:
R. RICHTER,
R. B. RICHTER.